[19] United States Patent
Ishimi et al.

[11] 4,374,807
[45] Feb. 22, 1983

[54] METHOD FOR RECOVERING ALUMINUM FLUORIDE FROM FLUORINE-CONTAINING AQUEOUS ALUMINUM NITRATE SOLUTIONS

[75] Inventors: Hiroshi Ishimi, Yokohama; Hisaaki Shimauchi; Chuzaburo Tanaka, both of Tohkaimura, all of Japan

[73] Assignee: Sumitomo Metal Mining Company Ltd., Tokyo, Japan

[21] Appl. No.: 169,830

[22] Filed: Jul. 17, 1980

[30] Foreign Application Priority Data

Jul. 30, 1979 [JP] Japan .................................. 54/96987

[51] Int. Cl.³ .......................................... C01G 43/025
[52] U.S. Cl. ..................................... 423/11; 423/122; 423/261
[58] Field of Search .................... 423/11, 18, 122, 261, 423/495

[56] References Cited

U.S. PATENT DOCUMENTS 3,338,683  8/1967  Grant .................................. 423/261
3,737,513  6/1973  Wiewiorowski et al. ............ 423/11
4,235,860 11/1980  Wohleber et al. .................. 423/495
4,238,469 12/1980  Schmidt et al. .................... 423/495

Primary Examiner—Leland A. Sebastian
Attorney, Agent, or Firm—Watson, Cole, Grindle & Watson

[57] ABSTRACT

In a process for converting $UF_6$ into $UO_2$, the $UF_6$ is brought into contact with an aqueous aluminum nitrate solution. The resultant product is solvent extracted with tributyl phosphate to remove uranyl nitrate. The raffinate has a fluorine/aluminum (F/Al) weight ratio within the range of from about 0.5 to about 1.2. A sufficient quantity of hydrofluoric acid is added to the raffinate to minimize the solubility of aluminum fluoride ($AlF_3$) therein and thereby maximize the precipitation potential of $AlF_3$. Generally this occurs when sufficient hydrofluoric acid has been added to cause the F/Al weight ratio to be within the range of from about 1.8 to about 2.2. As a result of this treatment, the raffinate is divided into an uranium-containing aqueous solution and an $AlF_3$ precipitate which contains substantially no uranium.

20 Claims, No Drawings

METHOD FOR RECOVERING ALUMINUM FLUORIDE FROM FLUORINE-CONTAINING AQUEOUS ALUMINUM NITRATE SOLUTIONS

BACKGROUND OF THE INVENTION

1. Field of the Invention

The present invention relates to a method for the recovery of fluorine in solid state from aqueous aluminum nitrate solutions containing fluorine ions. The method is particularly suitable for use in recovering uranium-free aluminum fluoride after conversion of $UF_6$ to $UO_2$.

2. Description of the Prior Art

Enriched uranium is used as fuel in light water-type nuclear reactors. Since the uranium obtained from the enrichment of uranium is generally in the form of $UF_6$, it must be converted into $UO_2$ before it may be used in the reactor. Among the many known methods available for converting $UF_6$ into $UO_2$, the ammonium diuranate (referred to hereinafter as ADU for short) method and the gas reaction method have won general recognition.

A typical version of the ADU method is disclosed in Japanese Patent Publication No. 7368/46, published on Feb. 24, 1971. The procedure involved may be roughly described as follows. $UF_6$, on being brought into contact with an aqueous aluminum nitrate [$Al(NO_3)_3$] solution, is converted into uranyl nitrate [$UO_2(NO_3)_2$] in accordance with the following reaction:

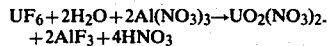

$$UF_6 + 2H_2O + 2Al(NO_3)_3 \rightarrow UO_2(NO_3)_2 + 2AlF_3 + 4HNO_3$$

The resultant solution is subjected to solvent extraction with tributyl phosphate (referred to hereinafter as TBP for short) and is thereby separated into an aqueous solution containing $UO_2(NO_3)_2$ and a raffinate containing nitric acid [$HNO_3$] and $Al(NO_3)_3$. The extract containing $UO_2(NO_3)_2$ is then contacted with ammonia gas and the $UO_2(NO_3)_2$ is thereby converted into ADU, which is precipitated. This ADU is readily separated by filtration, then roasted and subsequently reduced with hydrogen to produce $UO_2$ powder.

The raffinate mentioned above contains $AlF_3$, $HNO_3$ and $Al(NO_3)_3$. When such solution is evaporated to dryness, a vapor containing nitrogen oxide is driven off and the residue is a mixed powder of $AlF_3$ and $Al_2O_3$. Nitric acid recovered by condensation of the vapor may be recycled for the preparation of an aqueous aluminum nitrate solution, but the evaporation process consumes a large amount of heat and the solid state mixed powder of $AlF_3$ and $Al_2O_3$ produced by such process is not particularly valuable as a commercial product. Moreover, the traces of uranium contained in the raffinate are trapped in a concentrated state in the mixed powder making it imperative for the mixed powder to be kept in strict, prolonged confinement as a radioactive waste. Such disadvantages have been borne inevitably by this prior method.

In the gas reaction method, $UO_2$ powder is obtained by hydrolyzing $UF_6$ in a gaseous state by direct contact with hot steam and then subjecting the resultant $UO_2F_2$ to treatment with hydrogen and hot steam. The steam which is discharged from this process contains hydrogen fluoride which may generally be condensed for recovery of hydrofluoric acid. The hydrofluoric acid thus recovered contains a trace of uranium. Although refined hydrofluoric acid which contains substantially no uranium may be obtained by subjecting the hydrofluoric acid to further distillation, there is little commercial demand for even the refined hydrofluoric acid. Under these circumstances, painstaking efforts are being made by those working in this art in search of some outlet or other use for the hydrofluoric acid so produced.

SUMMARY OF THE INVENTION

According to the present invention, $UF_6$ (usually obtained in the process of uranium enrichment) is converted into $UO_2(NO_3)_2$ by bringing the $UF_6$ into contact with an aqueous aluminum nitrate solution to thereby produce an intermediate solution containing aluminum fluoride, uranyl nitrate and residual aluminum nitrate. Such process is generally conducted such that the F/Al weight ratio in the intermediate solution is within the range of from about 0.5 to about 1.2. Then the intermediate solution is subjected to solvent extraction with TBP, and the raffinate from the extraction process is mixed with sufficient hydrofluoric acid (HF) to minimize the solubility of aluminum fluoride. More specifically, sufficient HF should be added to provide an F/Al weight ratio within the range of from about 1.8 to about 2.2. The aluminum fluoride precipitate produced by the addition of hydrofluoric acid is remarkably substantially free of uranium and may be separated and recovered.

An important aspect of this invention, therefore, is the provision of a method for the recovery of fluorine containing substantially no uranium from a fluorine-ion containing aqueous aluminum nitrate solution which contains traces of uranium.

DETAILED DESCRIPTION OF THE INVENTION

In the ADU method described above, the F/Al weight ratio in the aqueous aluminum nitrate solution subsequent to the introduction therein of the $UF_6$ is generally prescribed to be within the range of from about 0.5 to about 1.2. The reason for this lower limit of 0.5 is to maximize the amount of $UF_6$ which may be introduced therein. On the other hand, when the weight ratio exceeds about 1.2, precipitation of $AlF_3$ begins to occur and the subsequent step of solvent extraction with TBP is hindered. For these reasons, the aforementioned range has been maintained. The raffinate resulting from the solvent extraction process, therefore, contains dissolved $AlF_3$, free $HNO_3$ and excess $Al(NO_3)_3$, and the F/Al weight ratio therein is generally within the range of from about 0.5 to about 1.2.

As described above, the raffinate contains traces of uranium as uranium ions. When hydrofluoric acid is added to this raffinate in sufficient quantity to minimize the solubility of aluminum fluoride, the precipitation of the latter is maximized. Thus, substantially all of the $AlF_3$ and $Al^{3+}$ present in the raffinate as well as the $F^-$ present in the added hydrofluoric acid combine into $AlF_3$, and the greater part of this $AlF_3$ is precipitated. And such precipitate has been found to contain substantially no uranium. Generally it has been found that the solubility of $AlF_3$ is lowest and the ratio of precipitation is therefore highest with the F/Al weight ratio in the solution is within the range of from about 1.8 to about 2.2. Conversely the ratio of precipitation is lower when the F/Al weight ratio falls short of 1.8 or rises above 2.2.

The AlF$_3$ precipitate obtained as described above possesses unusually high filtrability and accordingly can be easily separated using conventional filtration methods. As the result of the foregoing, the raffinate containing AlF$_3$, HNO$_3$ and Al(NO$_3$)$_3$ plus traces of uranium as uranium ions may be divided into a substantially uranium-free AlF$_3$ precipitate and an uranium ion containing aqueous solution preponderantly containing HNO$_3$. The resultant aqueous nitric acid solution may be recycled and used for the preparation of an aqueous Al(NO$_3$)$_3$ solution for treating UF$_6$. The uranium-free AlF$_3$ precipitate, when freed from its water of crystallization in air at temperatures within the range of from about 500° to 600° C., is converted into a white powdery substance which can be used in its unmodified form as a flux in an aluminum refinery.

The fluorine ion containing aqueous aluminum nitrate solutions to which the method of this invention is applicable are not limited to the raffinate described above. The invention is also applicable to raffinates which occur when the UO$_2$F$_2$ resulting from the hydrolysis of UF$_6$ is dissolved in an aqueous Al(NO$_3$)$_3$ solution and the resultant aqueous solution containing UO$_2$(NO$_3$)$_2$, AlF$_3$, HNO$_3$ and Al(NO$_3$)$_3$ is subjected to solvent extraction with TBP for separation of UO$_2$(NO$_3$)$_2$. Also the invention is applicable to liquid products which result from the reaction of aqueous Al(NO$_3$)$_3$ solution with waste hydrofluoric acid or waste gases containing hydrogen fluoride. Moreover, uranium ions may be totally absent from the solutions to which the method of this invention is applied.

In the case of ADU methods involving the use of aqueous Al(NO$_3$)$_3$ solutions, the aqueous HNO$_3$ solutions which remain from the recovery of AlF$_3$ may be recycled for the preparation of Al(NO$_3$)$_3$. The hydrofluoric acid used in the method of the present invention, therefore, may contain traces of uranium as uranium ions. This means that the hydrofluoric acid recovered by condensation in the above-mentioned gas reaction method may be utilized in the method of the present invention.

Moreover, as described above, the present invention is particularly effective when it is used in connection with an aqueous aluminum nitrate solution which contains AlF$_3$, HNO$_3$ and Al(NO$_3$)$_3$ and further contains traces of uranium as uranium ions. The present method almost completely precludes leakage of uranium from the reaction system and offers a solution to the problems of environmental pollution by radioactive waste.

Several working examples of the invention are set forth hereinbelow:

EXAMPLE I 135 g of UF$_6$ were added to 1 liter of an aqueous aluminum nitrate solution containing 52 g/liter of Al and 11 g/liter of F. Thus, 1.05 liters of an aqueous aluminum nitrate solution containing 85 g/liter of U, 49 g/liter of Al and 53 g/liter of F was obtained. This resultant aqueous solution was subjected to solvent extraction using TBP for separation of UO$_2$(NO$_3$)$_2$. The raffinate had a volume of 1 liter and contained 0.6 mg/liter of U, 52 g/liter of Al and 56 g/liter of F. This raffinate was divided into three equal portions, each 0.3 liter in volume. To these portions, 24, 29 and 32 g of an industrial grade hydrofluoric acid (containing 55% of HF) were added respectively to induce precipitation of aluminum fluoride. The precipitates formed in the portions were recovered by filtration. The recovered aluminum fluoride portions were dried in air at 500° C. to provide white, powdery, anhydrous AlF$_3$ crystals. The amounts and compositions of the filtrates and dry aluminum fluoride portions are shown in Table 1 (Run Nos. 1–3).

TABLE 1

| Run No. | F/Al weight ratio after addition of hydrofluoric acid* | Filtrate | | | | | Dry aluminum fluoride | | |
|---|---|---|---|---|---|---|---|---|---|
| | | Amount of liquid (liter) | F (g/l) | Al (g/l) | HNO$_3$ (g/l) | U (mg/l) | Weight (g) | F (%) | U (ppm) |
| 1 | 1.88 | 0.28 | 16 | 7.3 | 320 | 0.6 | 38.4 | 64.3 | <1 |
| 2 | 2.05 | 0.28 | 12 | 5.1 | 320 | 0.6 | 43.5 | 65.8 | <1 |
| 3 | 2.15 | 0.29 | 15 | 3.2 | 320 | 0.6 | 43.9 | 66.2 | <1 |
| 4 | 2.09 | 0.29 | 13 | 4.8 | 250 | 1 | 44.2 | 65.5 | <1 |
| 5 | 2.15 | 0.37 | 12 | 5.3 | 290 | 0.7 | 40.6 | 66.7 | <1 |

*F/Al weight ratio = $\dfrac{\text{Weight of F in liquid (g) + weight of F added as hydrofluoric acid (g)}}{\text{Weight of aluminum in liquid (g)}}$

EXAMPLE 2

116 g of an UO$_2$F$_2$ powder resulting from the reaction of UF$_6$ with steam were dissolved in 0.3 liter of an aqueous aluminum nitrate solution containing 52 g/liter of Al and 11 g/liter of F. Thus, an aqueous aluminum nitrate solution containing 255 g/liter of U, 45 g/liter of Al and 51 g/liter of F was obtained. The resultant aqueous solution was subjected to solvent extraction with TBP for separation of UO$_2$(NO$_3$)$_2$. After this extraction, 0.3 liter of a raffinate remained. This raffinate contained 1 mg/liter of U, 52 g/liter of Al and 58 g/liter of F. 29 g of an industrial-grade hydrofluoric acid (containing 55% HF) were added to the raffinate to thereby cause precipitation of aluminum fluoride. The aluminum fluoride precipitate thus formed was separated by filtration and dried in air at 500° C. The amounts and compositions of the filtrate and the dry aluminum fluoride (Run No. 4) obtained are shown in Table 1.

EXAMPLE 3

0.3 liter of an aqueous aluminum nitrate solution containing 52 g/liter of Al and 11 g/liter of F was contacted with a hydrogen fluoride-containing gas resulting from the reaction of 66 g of UF$_6$ with steam. Thus, an aqueous solution containing 41 g/liter of Al, 47 g/liter of F and 0.7 mg/liter of U was obtained. 26 g of industrial-grade hydrofluoric acid (containing 55% HF) was added to the resultant aqueous solution to cause precipitation of aluminum fluoride. The aluminum fluoride precipitate thus formed was separated by filtration and dried in air at 600° C. The amounts and compositions of the filtrate and the dry aluminum fluoride (Run No. 5) obtained are shown in Table 1.

We claim:

1. A method for recovering aluminum fluoride from an aqueous aluminum nitrate solution which contains fluorine ions comprising:
   causing precipitation of said aluminum fluoride by adding a sufficient quantity of hydrofluoric acid to the solution to substantially minimize the solubility of aluminum fluoride in the resultant solution; and thereafter
   recovering the aluminum fluoride precipitate.

2. The method of claim 1 wherein said aqueous aluminum nitrate solution is contaminated with uranium ions, said precipitate being substantially free of uranium.

3. The method of claim 1 wherein a sufficient quantity of hydrofluoric acid is added to the aluminum nitrate solution to cause the F/Al weight ratio therein to be within the range of from about 1.8 to 2.2.

4. The method of claim 1 wherein the F/Al weight ratio in the original aluminum nitrate solution is within the range of from about 0.5 to 1.2.

5. The method of claim 1 wherein said aqueous aluminum nitrate solution comprises aluminum fluoride, nitric acid and aluminum nitrate.

6. The method of claim 1 wherein said aluminum fluoride precipitate is heated in air to a temperature of from about 500° to 600° C. to free it from its water of crystallization.

7. In a process for converting $UF_6$ into $UO_2$ wherein $UF_6$ is brought into contact with an aqueous aluminum nitrate solution to thereby produce an intermediate solution containing aluminum fluoride, uranyl nitrate and residual aluminum nitrate, and wherein the uranyl nitrate is removed from said intermediate solution to present a resultant solution containing aluminum fluoride and aluminum nitrate, the improvement of which comprises:
   adding a sufficient quantity of hydrofluoric acid to the resultant solution to substantially minimize the solubility of aluminum fluoride therein and thereby produce a substantially uranium-free aluminum fluoride precipitate and an uranium-containing aqueous solution; and thereafter
   separately recovering the substantially uranium-free aluminum fluoride precipitate thus produced.

8. The method of claim 7 wherein a sufficient quantity of hydrofluoric acid is added to the resultant solution to cause the F/Al weight ratio therein to be within the range of from about 1.8 to 2.2.

9. The method of claim 7 wherein the F/Al weight ratio in the resultant solution is within the range of from about 0.5 to 1.2.

10. The method of claim 7 wherein said aqueous aluminum nitrate solution comprises aluminum fluoride, nitric acid and aluminum nitrate.

11. The method of claim 7 wherein said uranium-containing aqueous solution contains a predominant quantity of nitric acid.

12. The method of claim 11 wherein said uranium-containing aqueous solution is used to prepare aluminum nitrate for treating said $UF_6$ and thereby producing aluminum fluoride.

13. The method of claim 7 wherein said aluminum fluoride precipitate is heated in air to a temperature of from about 500° to 600° C. to free it from its water of crystallization.

14. In a process for converting $UF_6$ into $UO_2$ wherein $UF_6$ is subjected to hydrolysis to produce $UO_2F_2$ and the latter is brought into contact with an aqueous aluminum nitrate solution to thereby produce an intermediate solution containing aluminum fluoride, uranyl nitrate and residual aluminum nitrate, and wherein the uranyl nitrate is removed from said intermediate solution to present a resultant solution containing aluminum fluoride and aluminum nitrate, the improvement of which comprises:
   adding a sufficient quantity of hydrofluoric acid to the resultant solution to substantially minimize the solubility of aluminum fluoride therein and thereby produce a substantially uranium-free aluminum fluoride precipitate and an uranium-containing aqueous solution; and thereafter
   separately recovering the substantially uranium-free aluminum fluoride precipitate thus produced.

15. The method of claim 14 wherein a sufficient quantity of hydrofluoric acid is added to the resultant solution to cause the F/Al weight ratio therein to be within the range of from about 1.8 to 2.2.

16. The method of claim 14 wherein the F/Al weight ratio in the resultant solution is within the range of from about 0.5 to 1.2.

17. The method of claim 14 wherein said aqueous aluminum nitrate solution comprises aluminum fluoride, nitric acid and aluminum nitrate.

18. The method of claim 14 wherein said aluminum fluoride precipitate is heated in air to a temperature of from about 500° to 600° C. to free it from its water of crystallization.

19. The method of claim 14 wherein said uranium-containing aqueous solution contains a predominant quantity of nitric acid.

20. The method of claim 19 wherein said uranium-containing aqueous solution is used to prepare aluminum nitrate for treating said $UF_6$ and thereby producing aluminum fluoride.

* * * * *